United States Patent [19]
Bishop

[11] 4,274,574
[45] Jun. 23, 1981

[54] LINEAR MOTION CABLE DRIVE

[75] Inventor: Bernard F. Bishop, Chicago, Ill.

[73] Assignee: Illinois Tool Works Inc., Chicago, Ill.

[21] Appl. No.: 112,666

[22] Filed: Jan. 16, 1980

[51] Int. Cl.³ .............................................. B65H 17/24
[52] U.S. Cl. .................................................... 226/170
[58] Field of Search ......................... 226/170, 171, 172

[56] References Cited
U.S. PATENT DOCUMENTS

| | | | |
|---|---|---|---|
| 2,679,924 | 6/1954 | Powell | 226/172 |
| 2,789,687 | 4/1957 | Cuccio | 226/170 |
| 2,792,930 | 5/1957 | Graham | 203/225 |
| 3,265,269 | 8/1966 | Godderidge | 226/172 |
| 3,586,227 | 6/1971 | Krogsrud | 226/170 |

Primary Examiner—Edward J. McCarthy
Attorney, Agent, or Firm—Richard K. Thomson; Thomas W. Buckman

[57] ABSTRACT

A linear motion cable drive including a plurality of drive assemblies each including a drive cable helically wrapped around the driven cable with means to rotate the drive assemblies about the axis of the driven cable to negate the rotational effects of the helical wrapping. Apparatus is provided to permit discontinuities in the form of larger or smaller cable portions to be fed by the drive unit without causing rotation or twisting. The same helical wrapping can be used in an overlapped, reverse wrap configuration to form a cable locking device.

10 Claims, 9 Drawing Figures

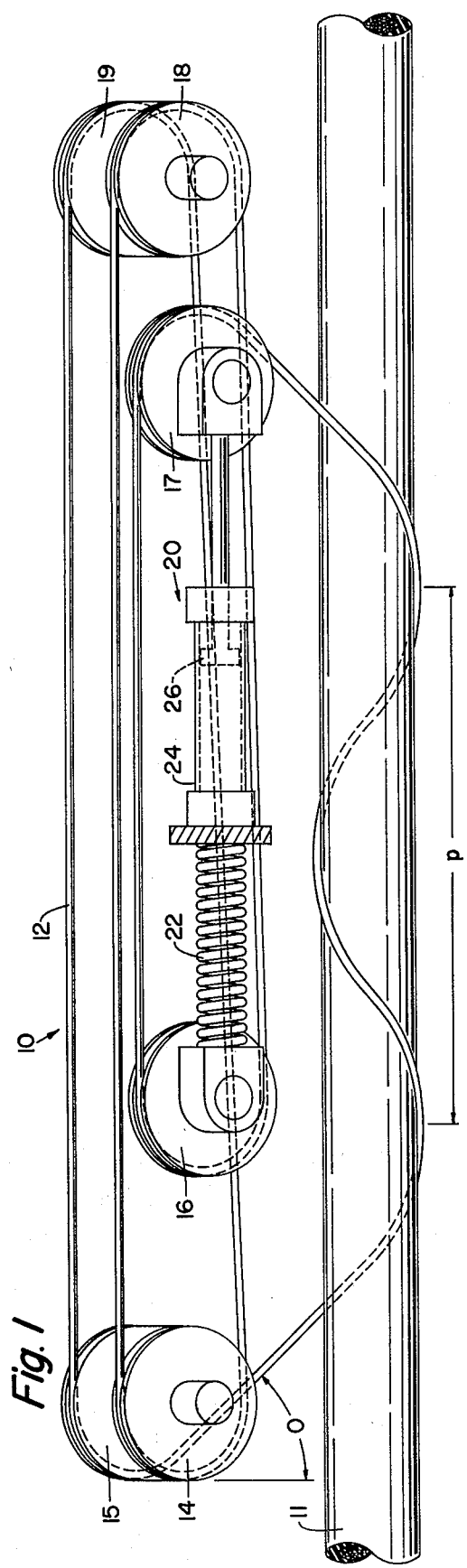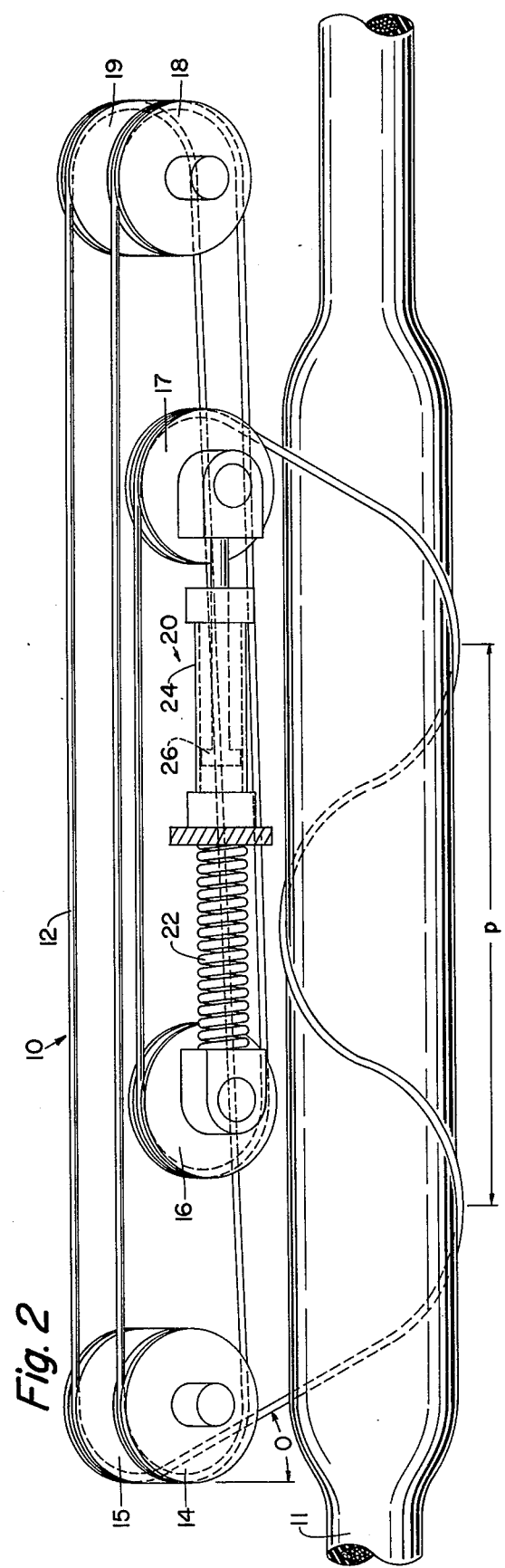

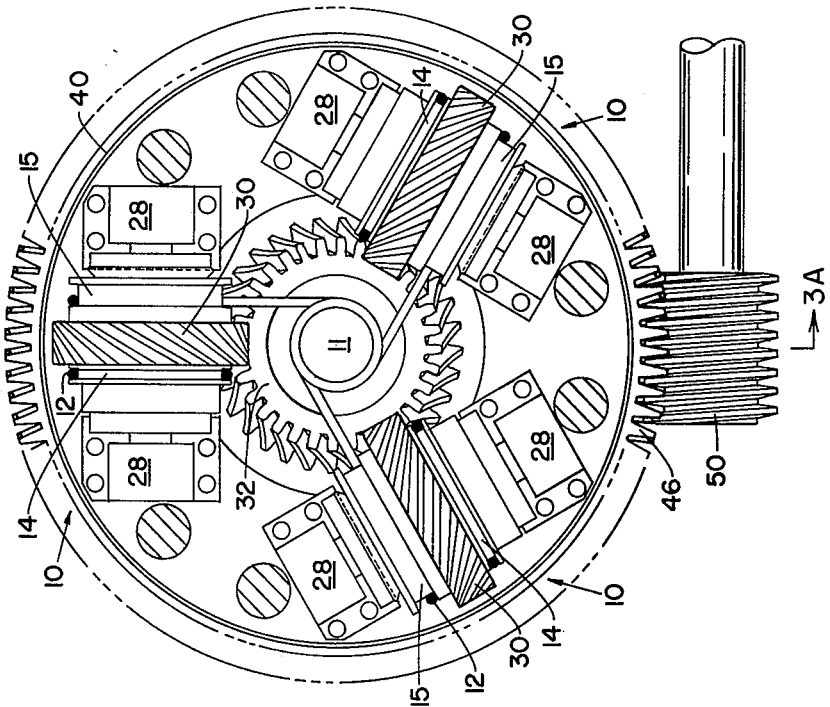
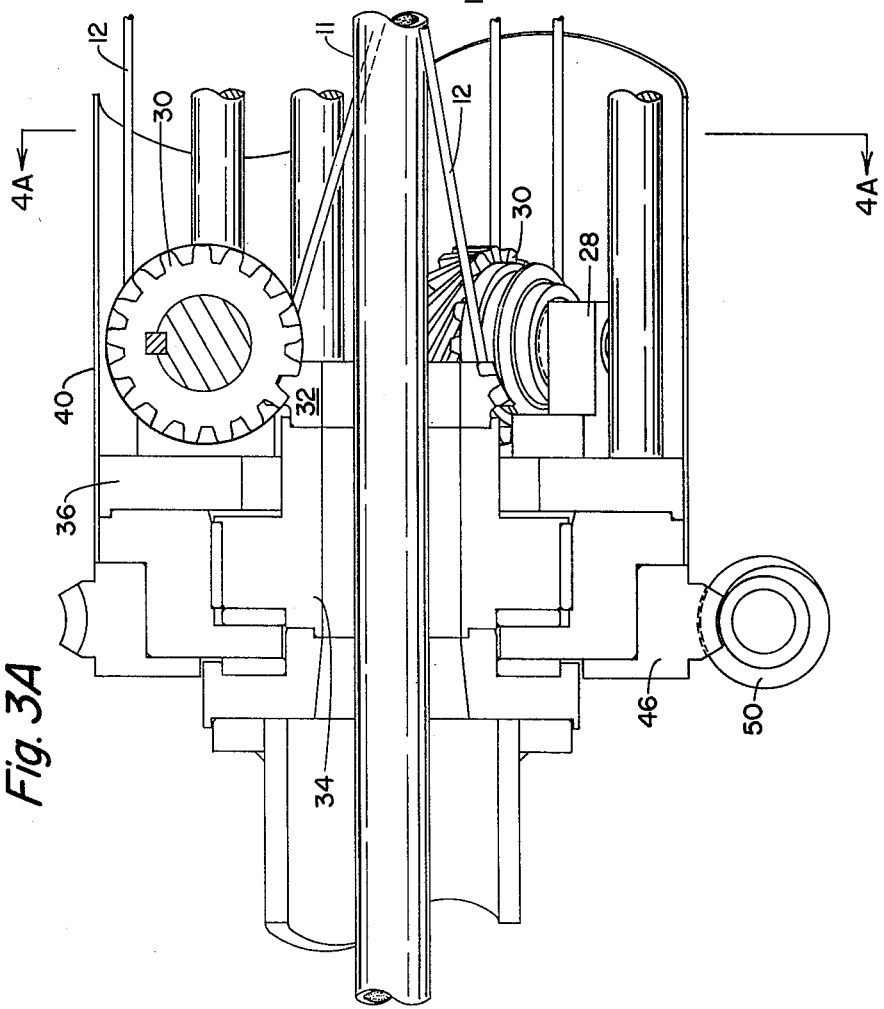

LINEAR MOTION CABLE DRIVE

BACKGROUND AND BRIEF DESCRIPTION OF THE INVENTION

The present invention relates to a linear motion drive means for cables and the like.

Various means have been devised to move a cable in a direction lying along its axis. It will be understood that the term "cable" when appearing in the phrase "driven cable", as it is used throughout this specification shall include, in addition to its conventional meaning, such items as lengths of pipe, thin-walled tubes, and solid rod or bar stock. Some of these prior art driving devices are objectionable because they cause or allow rotation of the cable. While this may be desirable for some uses, there are other applications where such rotation cannot be tolerated.

Other drive devices employ rollers, belts or chains which merely lie along and engage the exterior of the driven cable transmitting frictional drive forces. Such drive means are subject to slippage which is objectionable, not only because the cable is not positively driven, but also because the slippage increases the amount of localized wear on the drive means and/or the cable which can result in further slippage or localized breakages. Additionally, these devices are objectionable for failing to adequately distribute the drive forces since they have only point or limited line contact with the surface of the cable.

The present invention is directed to a linear cable drive which overcomes these deficiencies. More particularly, the present invention is directed to a linear cable drive comprised of a plurality (preferably three or more) of drive assemblies each of which includes a drive cable or belt which is helically wrapped around the driven cable. If these elements were then, to merely be driven, they would rotate, as well as translate, the driven cable. In order to prevent this undesired rotation, the drive assemblies are rotated about the longitudinal axis of the driven cable in a direction, and at a rate, to unwind the leading end of the drive cable and cancel out the rotational forces.

Two devices known in the prior art which are similar in some respects to the present invention are shown in U.S. Pat. Nos. 2,789,687 and 3,265,269. Due to the generally unstable configurations of these drive assemblies, each of these devices requires a guide tube which has a close tolerance with respect to the pipe or cable which is to be driven. Accordingly, these drive systems are incapable of handling a discontinuity which is either smaller or larger than the base peripheral dimension. It should be noted here that merely providing clearance and a stable (self-balancing) configuration would be inadequate to accommodate the discontinuity. The same length of drive cable engaging a larger or smaller peripheral dimension would cause the discontinuity to undergo a rotational twisting. As this discontinuity is apt to be a splice or connector between adjacent cable lengths, such a twisting would be particularly undesirable and potentially harmful.

The present invention provides a means to accommodate discontinuities in cable peripheral dimension while maintaining a linear, non-twisting drive relationship. An additional advantage of the present invention is that this drive means is provided with means to facilitate the initial infeed of the cable. By detaching certain elements, the helical drive belts can be unwound to enlarge the central space so that the cable may be more easily inserted, possibly even permitting room for insertion of a hand and arm, depending on the size of the unit.

A further advantage of the drive means of the present invention is its versatility. A particular unit can handle a wide range of cable diameters. Further, additional drive force can be provided by adding assemblies to a particular unit, stacking units end to end or interdigitating units.

A further feature of the present invention is that the concept can be utilized to form a holding device in lieu of a drive mechanism.

These and other features, advantages and objects of the present invention will be better understood after reading the following specification in conjunction with the accompanying drawings.

BRIEF DESCRIPTION OF THE DRAWINGS

FIG. 1 is a schematic of a single drive assembly of the present invention;

FIG. 2 is a schematic of the drive assembly indicating the differences caused by an enlargement entering the region of the drive assembly;

FIG. 3A is a longitudinal section of the left end of the cable drive of the present invention as seen along line 3A—3A of FIG. 4A;

FIG. 4A is a transverse section of the left end of the cable drive of the present invention as taken along line 4A—4A in FIG. 3A;

DETAILED DESCRIPTION OF THE PREFERRED EMBODIMENT

Figure 4B:
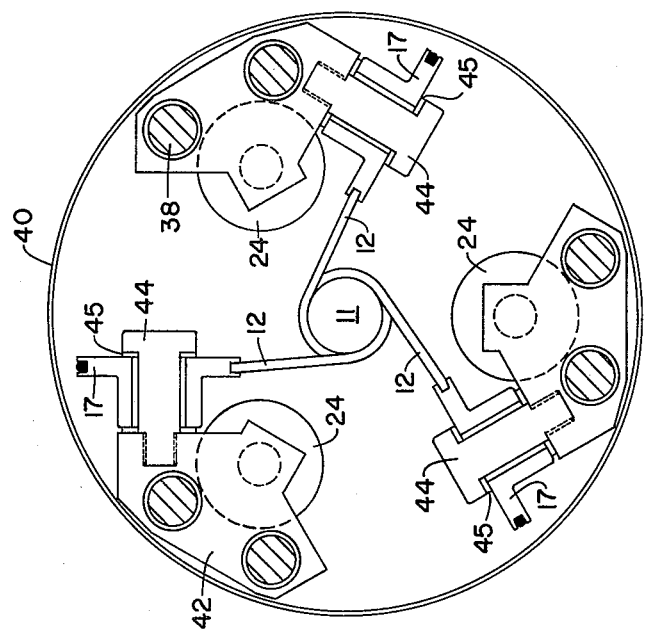
FIG. 4B is a transverse section of the right end of the cable drive of the present invention as taken along line 4B—4B of FIG. 3B.
Figure 3B:
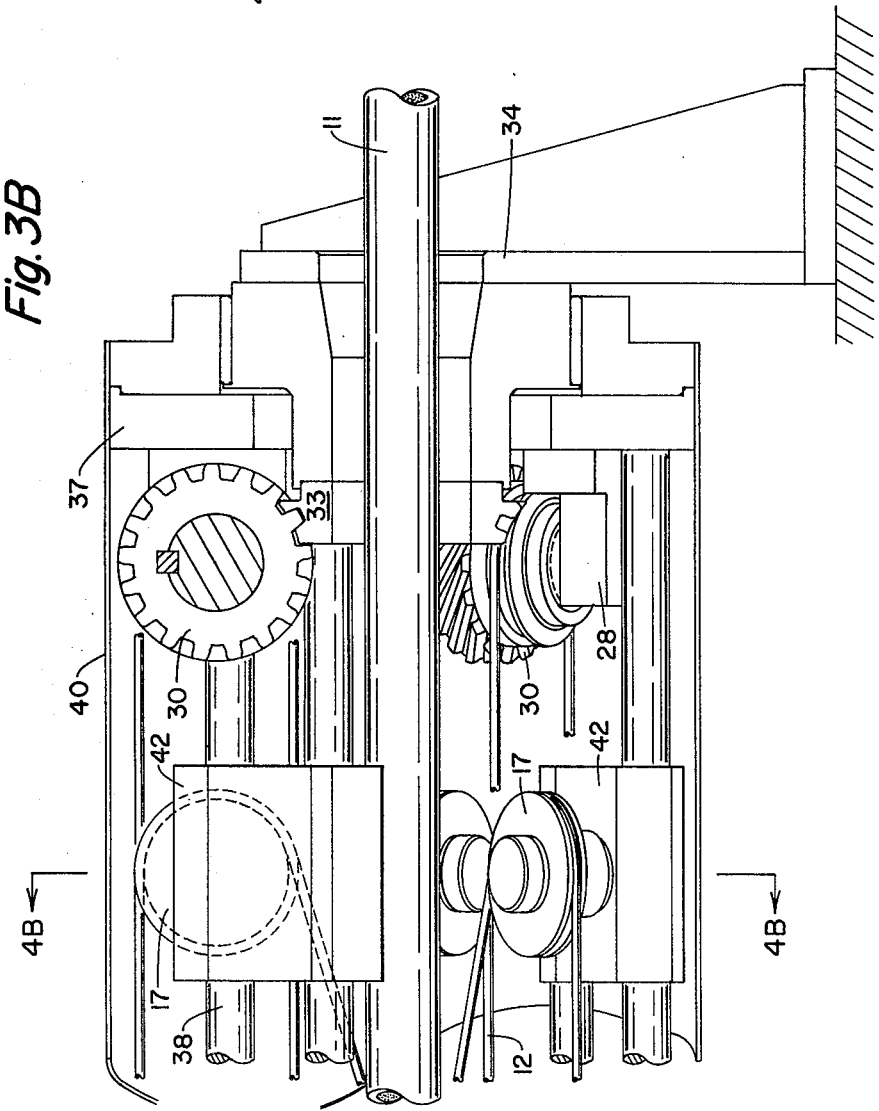
FIG. 3B is a longitudinal section of the right end of the cable drive of the present invention as seen along line 3B—3B of FIG. 4B.

A preferred embodiment of the present invention is depicted schematically at 10 in FIG. 1. Each assembly includes a drive cable or belt 12 helically wrapped around driven cable 11 forming a capstan type drive. While only a single drive assembly has been shown there, for simplicity, it will be appreciated that the invention contemplates the use of a plurality of such assemblies 10 (preferably three or more). The reason at least three such assemblies are needed is that with three or more assemblies equally spaced about the periphery of the driven cable 11, the pulls of the drive cables or belts 12 on cable 11 have a self-balancing and self-centering effect obviating guides or the like. The optimum number of cables will depend on the amount of drive necessary to push or pull cable 12. Further, the maximum number of cables used in a drive unit is a function of the peripheral dimensions of cables 11 and 12 with a maximum of fifteen drive assemblies being positionable about the cable in a single drive unit. It is preferred that each cable 12 be wrapped so as to have engagement with cable 11 through one and one-half turns, although any number of wraps may be used. Pulleys or sheaves 14, 15, 16, 17, 18 and 19 guide cable 12 through its course. Although pairs of pulleys 14, 15 and 18 and 19 have been shown as being displaced from one another in the schematic, these pairs are actually coaxial in this preferred embodiment.

The amount of driving force which can be transmitted from drive cable 12 to the driven cable 11 without slippage is a function of three parameters: the coefficient of friction between cables 11 and 12, the number of wraps (amount of contact) of cable 12 around cable 11, and the tension in drive cable 12. A similar relationship exists for non-slipping drive between pulleys 14, 15, 18 and 19 and cable 12 with a different (probably lower) coefficient of friction and the amount of wrapping about the pulleys having importance. It is for this reason that pairs of pulleys 14, 15 and 18, 19 are used. This increases the amount of drive force possible without slipping. Further, it will be apparent that should the coefficient of friction for the particular pulley and belt materials chosen be insufficient, additional pulleys could readily be added to increase the number of wraps and, accordingly, the amount of drive force available. Alternatively a multiple wrap capstan (not shown) could be used in place of these plurality of pulleys.

Pulleys 16 and 17 form part of a tensioning and adjusting device shown generally at 20. Tensioning pulley 16 is provided with spring means 22 which exerts a biasing force in a first direction parallel to the axis of cable 11. Spring means 22 may, for example, take the form of a coil spring or a constant force spring. Spring means 24 biases adjustment pulley 17 in a second direction, opposite to the first, also parallel to the axis of the cable. Spring means 24 can take the form of a double acting pneumatic or hydraulic cylinder.

As depicted in FIG. 2, the tensioning and adjusting mechanism 20 will operate semi-automatically. That is, if an enlarged portion of cable enters into the drive unit the following sequence of events will occur: (1) the helical wrapping of the driven cable will require more drive cable length to accommodate the larger driven cable circumference. This can be accomplished by reducing the helix angle 'o' and the pitch length 'p' along the driven cable; (2) the operator detects the entry of the enlargement actuating air cylinder 24 to move piston 26 and pulley 17 to the left (as shown in FIG. 2) thereby increasing the amount of drive cable in the working run, an amount sufficient to accommodate the increase in the diameter of cable 11 which changes the helix angle and pitch length; and (3) the rate of movement axially of cable 11 will be reduced due to the decrease in the lead length of the helix but there will still be no rotation or twisting of cable 11 due to the orbiting mechanism to be described hereafter. A similar sequence of events will occur if a smaller length of cable (i.e., the cable having the base peripheral dimension following such a splice), however, the directions and rates of movement of the drive cable and adjustment pulley will be reversed.

The manner of operation of the device can be changed from semi-automatic to automatic by eliminating or stiffening spring means 22 (i.e., fixedly mounting pulley 16) and providing air sylinder 24 with a pressure which corresponds to the normal tension in cable 12. Any increase or decrease in tension will be a direct and proportional result of changes in cable diameter. The spring means 24, functioning as a linear spring, will adjust pulley 17 to the left or right to maintain the proper tension thereby feeding cable 12 into or out of the working run as is necessary.

The details of the embodiment are more completely shown in FIGS. 3A, 4A, 3B, 4B. Pulleys 14 and 15 are coaxially mounted in bearing 28. A gear is mounted intermediate pulleys 14 and 15 and keyed for rotation therewith. Each gear 30 meshes with a stationary gear 32. Any conventional sun and planetary gearing may be used for the gear set 30, 32 although a rotating worm and stationary wheel are preferred. Both gear 32 and its counterpart gear 33 at the opposite end of the drive unit are fixedly connected to ground by structure 34. End plates or discs 36 and 37 which mount bearings 28 are mounted for rotation on the stationary structure 34 by bearings. End plates 36 and 37 are interconnected by a plurality of tie rods 38 (two for each assembly 10) and the entire drive unit can be encased in a housing 40.

Turning now to FIG. 4B, the mounting blocks 42 for pulleys 17 are shown. Each pulley is cantilevered from mounting block 42 by a pin 44 which has a bearing 45. Tie rods 38 act as guides for blocks 42 and are moved therealong by air cylinders 24 to adjust the amount of cable in the system. This embodiment of the linear cable drive can accommodate large variations in cable diameter. This advantage accrues in part because the amount of drive force does not depend on the nearness of pulleys 14, 15, 18 and 19 to the driven cable 11 and, accordingly, these pulleys may be spaced apart as widely as necessary in order to accommodate the largest discontinuity anticipated for a particular application.

Mounted on at least one of the end plates 36, 27 is a sprocket 46. This sprocket is in turn driven by a motor through pinion 50. When the motor is actuated, end plate 36 rotates about structure 34 and the drive assemblies orbit about the axis of cable 11. The other end plate 37 is rotated about its structure 34 by virtue of tie rods 38 and housing 40 which interconnect the two end plates. As the assemblies 10 are rotated, engagement between gears 30 and 32, 33 cause the cables 12 to be driven so as to move cable 11 in a right-to-left direction (as shown in the drawings). Spring means 22 maintains the proper back tension on the cable 12 which is necessary in order for the capstan drive to work. The gear ratios chosen are such that the rate of unwinding of the leading end of cable 12 is sufficient to cancel the rotational forces of the helical wrap (i.e., the cable 11 will be translated linearly an amount equal to the helical lead length for each rotation of the assemblies). Spring means 24 responds to increased cable tension (automatically or semi-automatically) to accommodate cable lengths with larger or smaller peripheral dimensions as previously described.

Figure 5:
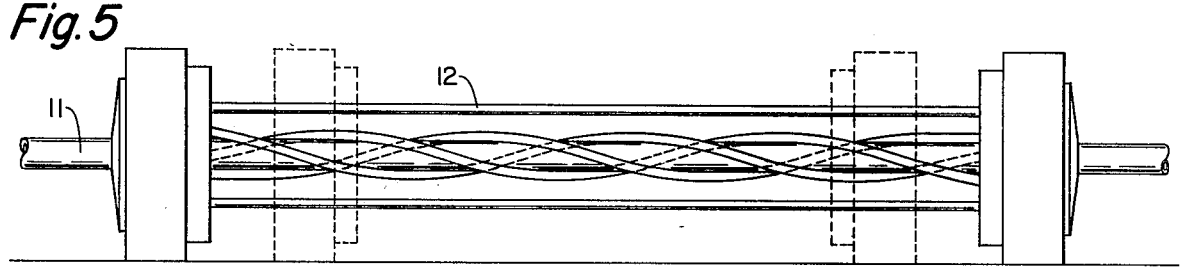
FIG. 5 is a side elevational view of a simplified alternate embodiment of the present invention.
Figure 6:
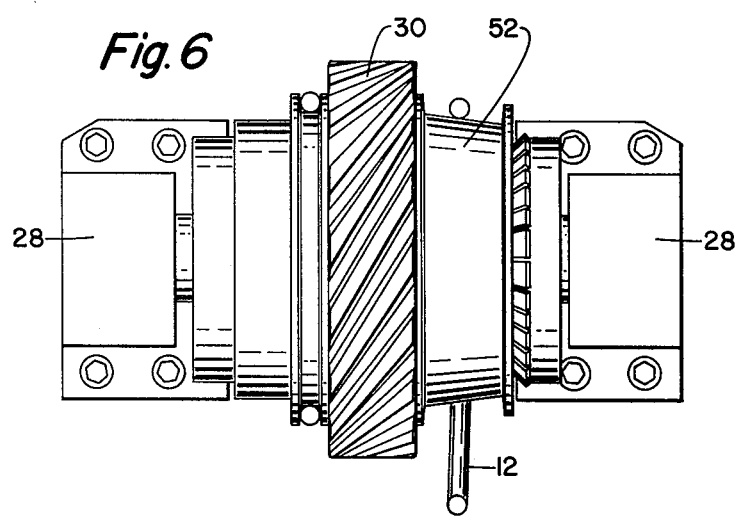
FIG. 6 is a detailed elevational view of the pulley assembly utilized in the FIG. 5 embodiment.

An alternate embodiment is depicted in FIGS. 5 and 6. The previous embodiment was designed to accommodate large differences in peripheral dimensions. If such large differences are not present in a particular application, the structure can be greatly simplified. For example, cable tensioning and adjusting device 20 can be omitted. Instead, in place of pulley 15 of each pair 14, 15 a tapered pulley 52 can be substituted. These tapered pulleys will accommodate small changes in peripheral dimensions by the cable 12 moving up or down the taper from its normal central running position. Where the amount of cable diameter variation is small enough to be accommodated by such a tapered pulley, then the tie-rods and housing can also be eliminated and the two end plates merely driven by two gears interconnected by a jack shaft (not shown).

A number of additional advantages accrue to this simplified embodiment. One of the end plates 36, 37 can be rotated relative to the other to unwrap the helix formed by the inner runs of cables 12. This will, of course, cause the outer cable runs to twist inwardly but the opening through which cable 11 must pass will be substantially enlarged, thereby facilitating the initial infeed of the cable. Further, these plates may be stacked interdigitating the plates of two drive units thereby effectively doubling the available drive force with a minimum increase in overall length. Of course, if the space is available, either of these embodiments can be stacked end to end along the cable in order to provide additional drive capacity.

FIG. 5 also depicts a feature present in both embodiments. For smaller diameters, relatively flexible cables with a small number of drive cables (five or less), cable 11 will assume a serpentine path due to the high tension in cables 12. In addition to the frictional drive forces transmitted by the helical capstan effect, this weaving creates what is called a rope effect increasing the amount of drive force transmitted to cable 11.

Figure 7:
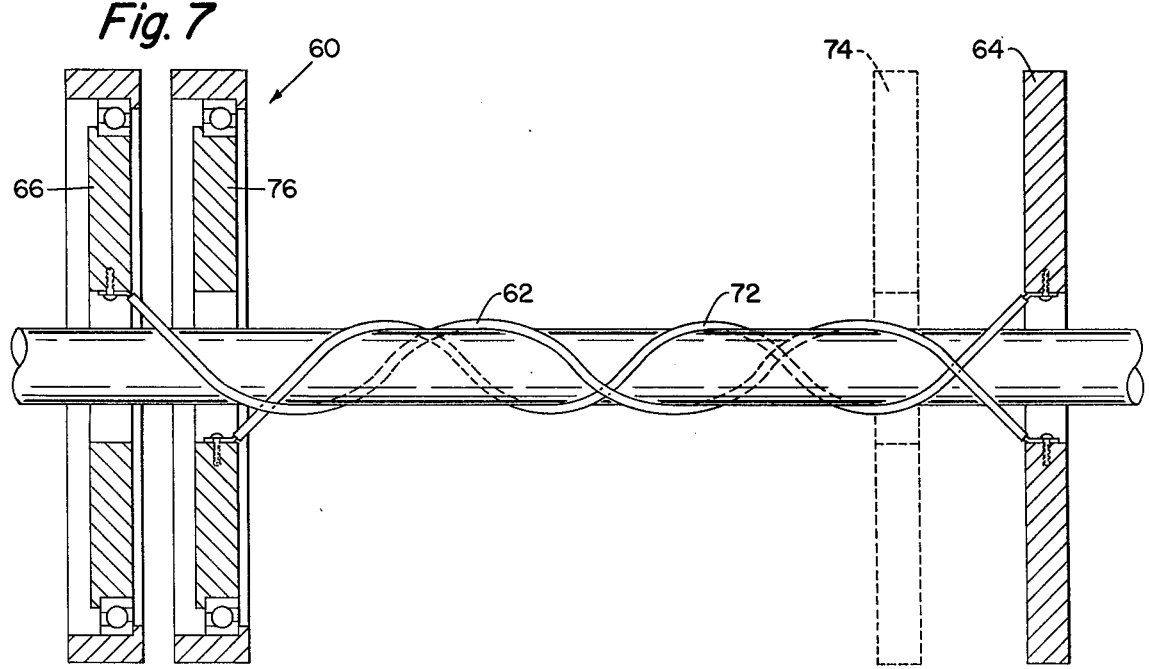
FIG. 7 is a side elevational schematic of a locking device employing the principles of the present invention.

An additional feature which can be provided by the present invention is a brake or lock mechanism shown generally at 60 in FIG. 7. A plurality of belt segments 62 (only one of which is shown) are connected to end plates 64 and 66. A second plurality of segments 72 (again, one being shown) are connected to plates 64 and 76. A second stationary plate shown in dotted lines at 74 could be provided rather than connecting both sets of belt segments to plate 64. The plate 66 is rotated in one direction to helically wrapped belt segments 64 around cable 11. Then, plate 76 is rotated in the opposite rotational direction in order that belt segments 72 criss-cross and overlie segments 62. It is preferred that segments 62 and 72 be sufficient in number to cover the entire periphery of cable 11. The configuration thus formed has an effect similar to that of a chinese finger puzzle and will hold the cable against movement until it is once again desired to translationally move the cable.

Various changes, modifications and variations will suggest themselves to a person or ordinary skill in the art in light of the foregoing specification. For example, instead of endless cables 12, reel-to-reel cable systems can be employed. With a two unit system, the units can be used alternatively for continuous drive operation. Further, although the device has been shown used with cable having circular cross-section, it will be understood that oval and polygonal shapes can also be fed by this device. In addition, each drive belt may take the form of a two or three sided belt with a twist being put in its length prior to splicing its ends together. In this manner the drive belt will change its contact surface each revolution increasing the wear life of the drive belt. Accordingly, it is intended that all such changes, modifications and variations as come within the scope of the appended claims be included as part of the present invention.

I claim:

1. A linear cable drive means comprising:
a plurality of drive assemblies cooperating to drive a cable which has a base peripheral dimension, each assembly including a drive cable helically engaged around the periphery of the driven cable, means to drive said cable in said helical path, means to rotate the cable and its drive means about the axis of the driven cable at such a rate and in a direction so as to unwrap the forward end of the drive cable to negate any rotational forces imparted to the driven cable by said helical path, and means to allow passage of a length of driven cable which has a peripheral dimension that varies from said base peripheral dimension without imparting rotational forces thereto.

2. The linear cable drive means of claim 1 wherein said means for allowing passage of a length of cable having a peripheral dimension different from said base dimension comprises at least one length of reserve cable and spring means to permit at least a portion of the reserve cable length to be fed into and out of helical engagement with the driven cable as necessary.

3. The linear cable drive means of claim 2 wherein said spring means permits variation in the amount of cable in helical engagement with the driven cable automatically in response to the variation in the peripheral dimension of the driven cable.

4. The linear cable drive means of claim 1 wherein said means for allowing passage of a length of cable having a peripheral dimension different from said base dimension comprises a tapered drive pulley.

5. The linear cable drive means of claim 1 wherein said plurality of drive assemblies include at least three assemblies which are commonly associated with a pair of rotatable mounting plates that are rotationally driven to unwrap the cable.

6. The linear cable drive means of claim 5 wherein said drive means further includes a second plurality of drive assemblies which are associated with a second pair of rotatable mounting plates that are positioned axially outwardly of said first pair along said driven cable.

7. The linear cable drive means of claim 5 wherein one of said mounting plates can be rotated with respect to the other in order to vary the number of helical wraps about the driven cable.

8. The linear cable drive means of claim 5 wherein one of said mounting plates can be rotated with respect to the other in order to completely unwrap the inner helix to facilitate initial infeed of the driven cable.

9. A cable securing device comprising at least a first and second pair of discs at least one of each pair being rotatable, each disc having a central opening through which the cable may pass, the second pair of discs being longitudinally spaced by a distance greater than said first pair, a plurality of belt sections running longitudinally between the discs of each respective pair the longitudinal path of said first belt sections including at least a portion of path of said second belt sections whereby the rotatable disc of said first pair may be repeatedly rotated in one direction to wrap the first plurality of belt sections helically around the cable and the rotatable disc of said second pair may be repeatedly rotated in the opposite rotational direction to helically wrap the second plurality of belt sections around the cable in overlapping relationship to said first plurality in order to lock said cable against axial movement.

10. The cable securing device of claim 9 wherein a single fixed disc is common to each pair of discs.

* * * * *